M. V. B. Steinmetz.
Churn.

N° 61,772.    Patented Feb. 5, 1867.

Witnesses
Wm Albert Steel.
John Parker.

Inventor:
M. V. B. Steinmetz
By his Atty
H. Howson

United States Patent Office.

M. V. B. STEINMETZ, OF ANNVILLE, PENNSYLVANIA.

Letters Patent No. 61,772, dated February 5, 1867.

IMPROVEMENT IN CHURNS.

The Schedule referred to in these Letters Patent and making part of the same.

TO ALL WHOM IT MAY CONCERN:

Be it known that I, M. V. B. STEINMETZ, of Annville, Lebanon county, Pennsylvania, have invented certain Improvements in Churns; and I do hereby declare the following to be a full, clear, and exact description of the same, reference being had to the accompanying drawing, and to the letters of reference marked thereon.

My invention consists of certain devices, fully described hereafter, whereby the butter contained in a mass of cream may be quickly and thoroughly collected, the cream, during the operation, being maintained at the temperature best suited to facilitate that collection.

In order to enable others skilled in the art to make and use my invention, I will now proceed to describe its construction and operation, reference being had to the accompanying drawing, which forms a part of this specification, and in which—

Figure 1:
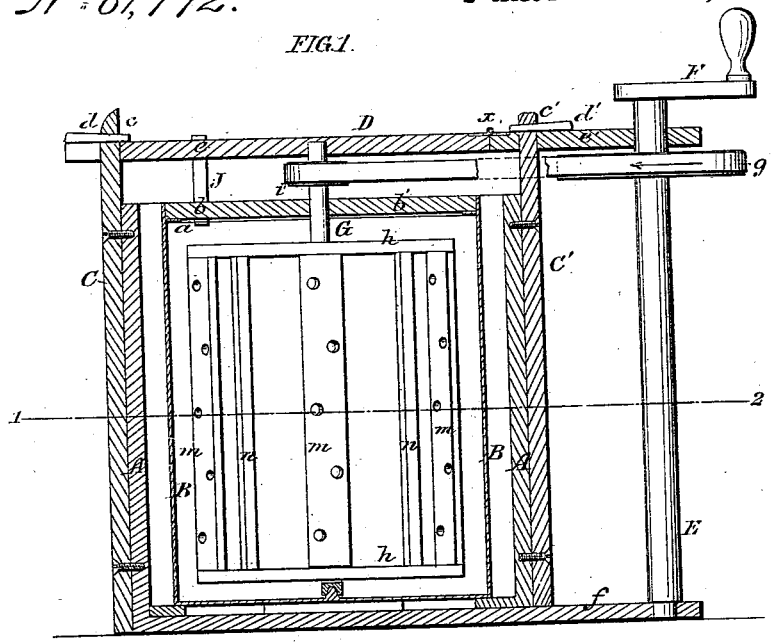

Figure 1 is a sectional elevation of my improved churn; and

Figure 2:
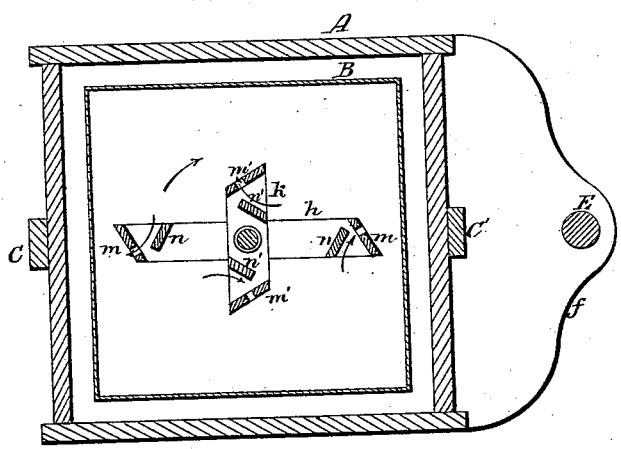

Figure 2, a sectional plan on the line 1–2, fig. 1.

A is a square wooden box, within which is secured a smaller box or case, B, of tin or other suitable material; and on a flange, $a$, near the top of the case, rest lids $b\ b'$, through each of which extends a tube, $j$. To opposite sides of the case A are secured standards $c\ c'$, to which is secured, by detachable keys $d\ d'$, the cross-bar D, the latter being in two parts, $e\ e'$, which are hinged together at $x$; and in the portion $e'$, and in a projection, $f$, near the bottom of the churn, turns a driving-shaft, E, at the upper end of which is a crank-handle, F. Through the centre of the case B, and through the lids of the same, extends the vertical spindle G of the dasher; the said spindle turning on a stud at the bottom of the case, and the upper end in the cross-piece D, near which it is furnished with a pulley, $i$, for receiving a belt or band from the pulley $g$ on the shaft E. To the dasher-spindle E are attached arms $h\ h$ and $k\ k$, the latter being shorter than, and at right angles to, the former; and betwen these arms extend the vertical perforated blades $m\ m\ m'\ m'$ and non-perforated blades $n\ n\ n'\ n'$, the latter being nearly at right angles to the blades $m\ m'$, as shown in the drawing. The cream is introduced into the case B, and the space between the case and the box A is filled with water, or other fluid, by which the body of the cream shall be maintained at a temperature of from 50° to 55° Fahrenheit. As the spindle G revolves, and the blades $m\ n$ of the dasher are forced through the mass of cream, they will impel the latter violently against the flat sides of the case; these sides being at such an angle to each other that the cream, instead of flowing continuously in one direction, (as in cylindrical, or nearly cylindrical, churns,) will recoil towards the shaft, where it will be further agitated by the paddles $m'\ n'$; this portion of the cream again flowing outwards, when another portion is thrown by the blades $m\ n$ against the sides of the case. Independent of the above-described action, the blades $n\ n'$ direct the cream nearly at right angles towards the blades $m\ m'$, so that it will be forced in streams through the perforations in these blades, and outwards into a body of cream moving into a different direction; the diverse currents, and the thorough agitation of the particles of cream among themselves, resulting from this action of the blades and of the flat sides of the case, quickly effecting the collection of the butter. When the butter has been thus obtained, the spindle G, with its arms and blades, which constitute the dasher, is withdrawn from the case B after first removing the key $c$, turning back the portion $e$ of the cross-bar D, and removing the lids $b\ b'$; the contents of the churn may then be withdrawn. After removing the key $c'$, the cross-piece D and shaft E may be detached.

I claim as my invention, and desire to secure by Letters Patent—

1. A case B, having four sides, in combination with a dasher composed of the spindle G, having arms and blades, and constructed and operating substantially as described.

2. The dasher, composed of the spindle G, with its arms $h\ k$, perforated blades $m\ m'$, and solid blades $n\ n'$, when the said blades are inclined in respect to each other as and for the purpose specified.

3. The cases A B, and shaft G with its arms and blades, in combination with the standards C C', cross-piece D, keys $c\ c'$, or their equivalents, and driving-shaft E, the whole being constructed substantially as described.

In testimony whereof I have signed my name to this specification in the presence of two subscribing witnesses.

M. V. B. STEINMETZ.

Witnesses:
CHARLES E. FOSTER,
W. J. R. DELANY.